(12) United States Patent
Sridhar et al.

(10) Patent No.: US 11,943,275 B2
(45) Date of Patent: Mar. 26, 2024

(54) SYSTEM AND METHOD FOR MANAGING ADAPTIVE BITRATE VIDEO STREAMING

(71) Applicant: Sandvine Corporation, Waterloo (CA)

(72) Inventors: Kamakshi Sridhar, Plano, TX (US); Lars Anton Gunnarsson, Bangkok (TH)

(*) Notice: Subject to any disclaimer, the term of this patent is extended or adjusted under 35 U.S.C. 154(b) by 58 days.

(21) Appl. No.: 17/357,245

(22) Filed: Jun. 24, 2021

(65) Prior Publication Data

US 2022/0407906 A1 Dec. 22, 2022

Related U.S. Application Data

(60) Provisional application No. 63/043,405, filed on Jun. 24, 2020.

(30) Foreign Application Priority Data

Jun. 21, 2021 (EP) .................................. 21180664

(51) Int. Cl.
*H04L 65/80* (2022.01)
*H04L 9/40* (2022.01)
(Continued)

(52) U.S. Cl.
CPC ............. *H04L 65/80* (2013.01); *H04L 65/60* (2013.01); *H04N 21/2662* (2013.01); *H04L 63/0457* (2013.01)

(58) Field of Classification Search
CPC ....... H04L 65/60; H04L 65/80; H04L 65/602; H04L 65/4069; H04L 63/0457;
(Continued)

(56) References Cited

U.S. PATENT DOCUMENTS 9,106,887 B1 * 8/2015 Owen .................... H04L 47/52
10,305,955 B1 * 5/2019 Li ........................ H04L 65/762
(Continued)

FOREIGN PATENT DOCUMENTS

EP 3439308 A1 2/2019
EP 3518494 A1 7/2019
WO WO-2008031293 A1 * 3/2008 ........... H04N 19/107

OTHER PUBLICATIONS

Extended European Search Report, European Patent Office, on corresponding EP Application No. 21180664.1, dated Sep. 8, 2021.
(Continued)

*Primary Examiner* — James N Fiorillo
(74) *Attorney, Agent, or Firm* — Amarok IP Inc.; Neil W. Henderson (57) ABSTRACT

A method and system for managing adaptive bitrate video streaming. The method including: retrieving raw data associated with a video stream traffic flow; determining at least one video chunk from the raw data of video stream traffic flow; determining parameters associated with the video chunk; determining a bitrate factor based on the parameters; determining a Quality of Experience (QoE) score based on the bitrate factor; and providing a traffic action based on the QoE score. The system including: an input module configured to retrieve raw data; an analysis module configured to determine at least one video chunk from the raw data and determine parameters associated with the video chunk and a bitrate factor based on the parameters; a QoE module configured to determine a QoE score based on the bitrate factor; and an output module configured to provide a traffic action based on the QoE score.

16 Claims, 5 Drawing Sheets

(51) Int. Cl.
*H04L 65/60* (2022.01)
*H04N 21/2662* (2011.01)

(58) Field of Classification Search
CPC .. H04L 47/70; H04N 21/2662; H04N 19/018; H04N 19/0236
USPC .......................................................... 709/219
See application file for complete search history.

(56) References Cited

U.S. PATENT DOCUMENTS

| | | | | |
|---|---|---|---|---|
| 10,944,698 | B2* | 3/2021 | Liu | H04L 47/83 |
| 11,606,409 | B1* | 3/2023 | Ergen | H04L 65/612 |
| 2005/0190794 | A1* | 9/2005 | Krause | H04N 21/26216 |
| | | | | 370/485 |
| 2011/0002344 | A1* | 1/2011 | Palin | H04L 47/30 |
| | | | | 370/428 |
| 2014/0219346 | A1* | 8/2014 | Ugur | H04N 19/58 |
| | | | | 375/240.12 |
| 2014/0341109 | A1* | 11/2014 | Cartmell | H04W 28/0263 |
| | | | | 370/328 |
| 2015/0012593 | A1* | 1/2015 | Phillips | H04L 47/70 |
| | | | | 709/204 |
| 2015/0012656 | A1* | 1/2015 | Phillips | H04L 47/70 |
| | | | | 709/226 |
| 2016/0234078 | A1* | 8/2016 | Jana | H04L 47/30 |
| 2016/0294898 | A1* | 10/2016 | Wheelock | H04N 21/8543 |
| 2016/0337426 | A1* | 11/2016 | Shribman | H04L 65/612 |
| 2018/0248806 | A1* | 8/2018 | Burnley | H04L 1/0002 |
| 2019/0069039 | A1* | 2/2019 | Phillips | H04N 21/64738 |
| 2019/0230010 | A1* | 7/2019 | Guo | H04L 43/0894 |
| 2019/0297356 | A1* | 9/2019 | Sivaraj | H04L 65/611 |
| 2020/0015121 | A1* | 1/2020 | Misra | H04W 28/0231 |
| 2020/0351322 | A1* | 11/2020 | Magzimof | H04L 65/61 |
| 2021/0250809 | A1* | 8/2021 | Masule | H04N 19/513 |
| 2021/0282127 | A1* | 9/2021 | Chaudhary | H04L 65/1059 |
| 2021/0360260 | A1* | 11/2021 | Rehman | H04N 19/154 |
| 2022/0239720 | A1* | 7/2022 | Madanapalli | H04L 65/1069 |

OTHER PUBLICATIONS

Pan Wubin et al., "QoE Assessment of Encrypted YouTube Adaptive Streaming for Energy Saving in Smart Cities", IEEE Access, vol. 6, May 23, 2018, pp. 25142-25156, XP011684133.

* cited by examiner

SYSTEM AND METHOD FOR MANAGING ADAPTIVE BITRATE VIDEO STREAMING

RELATED APPLICATIONS

The present disclosure claims priority to U.S. Provisional Patent Application No. 63/043,405 file Jun. 24, 2020 and European Patent Application No. 21180664 filed Jun. 21, 2021 which are hereby incorporated in their entirety herein.

FIELD

The present disclosure relates generally to managing computer network traffic. More particularly, the present disclosure relates to a system and method for managing adaptive bitrate video streaming on a computer network.

BACKGROUND

Use of online video continues to become more and more popular on computer networks. Streaming Video is a dominant traffic type in consumer data networks. Two of the most common video providers continue to be YouTube™ and Facebook™. A majority of the streaming video traffic is encrypted and delivered using Secure Socket Layer (SSL) version 3 or Quick UDP Internet Connections (QUIC), which is used by YouTube™, Facebook™ and the like.

SSL v3 uses Transmission Control Protocol (TCP), which allows passive measurement of latency using a three-way handshake and/or timestamp options, as well as packet loss by analyzing window gaps and retransmissions. QUIC on the other hand, being User Datagram Protocol (UDP) based, does not allow such measurements.

Operators are constantly striving to maximize the Quality of Experience (QoE) that can be achieved by expanding and optimizing the network and amending the policies associated with the network traffic. Understanding how Streaming Video traffic is delivered and experienced by end users is important in QoE measurements, as streaming video makes up a large portion of the traffic traversing the networks.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for managing adaptive bitrate video streaming, the method including: retrieving raw data associated with a video stream traffic flow; determining at least one video chunk from the raw data of video stream traffic flow; determining parameters associated with the video chunk; determining a bitrate factor based on the parameters; determining a Quality of Experience (QoE) score based on the bitrate factor; and providing a traffic action based on the QoE score.

In some cases, the parameters may include the bitrate and the duty cycle.

In some cases, the method may further include: determining at least one dimension from the raw data associated with the video stream traffic flow; and determining a QoE score based on the bitrate factor and the at least one dimension;

In some cases, the at least one dimension may be selected from a group including: service plan, device type, a location, a network, a site, access point name (APN), access node, access technology, interface, gateway, upstream channels, downstream channels, and 5G network slice.

In some cases, the traffic action may be based on the at least one dimension and the QoE score.

In some cases, the video streaming traffic flow may be an encrypted flow.

In some cases, the raw data may be retrieved at predetermined time intervals.

In some cases, the predetermined time interval may be between 200 and 500 milliseconds.

In some cases, the video chunk may be determined based on a period of activity followed by a period of silence in the video streaming traffic flow.

In another aspect, there is provided a system for managing adaptive bitrate video streaming, the system including: an input module configured to retrieve raw data associated with a video stream traffic flow; an analysis module configured to determine at least one video chunk from the raw data of video stream traffic flow and determine parameters associated with the video chunk and a bitrate factor based on the parameters; a Quality of Experience (QoE) module configured to determine a QoE score based on the bitrate factor; and an output module configured to provide a traffic action based on the QoE score.

In some cases, the analysis module may be configured to determine the parameters including the bitrate and the duty cycle.

In some cases, the analysis module may be further configured to determine at least one dimension from the raw data associated with the video stream traffic flow; and the QoE module may be further configured to determine a QoE score based on the bitrate factor and the at least one dimension.

In some cases, the at least one dimension may be selected from a group including: service plan, device type, a location, a network, a site, access point name (APN), access node, access technology, interface, gateway, upstream channels, downstream channels, and 5G network lice.

In some cases, the output module may be configured to provide the traffic action based on the at least one dimension and the QoE score.

In some cases, the video streaming traffic flow may be an encrypted flow.

In some cases, the input module may be configured to retrieve raw data at predetermined time intervals.

In some cases, the predetermined time interval may be between 200 and 500 milliseconds.

In some cases, the analysis module may be configured to determine the video chunk based on a period of activity followed by a period of silence in the video streaming traffic flow.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system for managing adaptive bitrate video streaming. Embodiments of the system and method are configured to determine a video data chunk in order to determine various measurements associated with the video data chunk. Embodiments may be configured to then determine bitrate, duty cycle and a bitrate factor from the determined measurements of the video data chunk. From this data, a score associated with the video may be determined, and policies may be applied to streaming video to improve a QoE for a subscriber based on the score associated with the video.

A challenge for operators is to maintain a good streaming video QoE in an environment where streaming video traffic is increasing while operating budgets are decreasing. Understanding the streaming video QoE is important to achieve the best possible experience under various circumstances. If a network operator does not understand the type of video being watched by subscribers, the network operator may not be able to adopt policies that will improve the QoE for its subscribers.

Generally, encryption is making analysis of streaming video and determining QoE using Deep Packet Inspection (DPI) difficult. Due to encryption, it may not be possible to analyze the content of the video stream and model a client state and buffer health associated with a video stream. A sudden decrease in data volume for a streaming video session could be associated with, for example, an end user pausing the video playback, a video player downshifting the quality due to network conditions, or the like. Changes in network conditions may be difficult to detect, especially in the case of Quick UDP Internet Connections (QUIC), which does not tend to allow any measurement of latency and/or packet loss.

While it may be possible to try to predict behavior based on assumptions, the variation in streaming services, clients, and devices makes this process difficult and may yield inaccurate results. The results may be inaccurate even when applying machine learning techniques on broad data sets, or using other techniques to try and improve accuracy.

Some solutions for Video QoE analytics may take a more encompassing view, considering various qualities and factors, for example:

Video Service;

Device type, for example, tablet, mobile phone, tv, or the like;

Resolution and Bitrate;

Initial Buffering Delay;

Buffer stalls; and the like.

In general, this type of solution relies on unencrypted traffic to get a detailed understanding of the video flow, the video flow's adaptive streaming segments and any shifts in quality.

As video streaming traffic flows have become more encrypted, there is now less information in the traffic flow from which Video QoE can be derived. There are some conventional methods that may do heuristic analysis on the encrypted video in conjunction with TCP parameters from TLS/HTTPS, but these conventional methods may fall apart in the case of QUIC, which is a delivery method of YouTube™ and Facebook™.

Embodiments of the disclosed method and system are intended to measure the quality of the network delivery of Adaptive Bitrate Video Streaming by analyzing the network activity level of a video stream traffic flow. From an analytical point of view, the video stream traffic flow may be broken into chunks should the subscriber traverse multiple locations in a mobile network, allowing the quality of each chunk to be measured, so that a QoE per location can be derived. A benefit of chunking the video and deriving a QoE per location is that a derived score can be rolled up and/or aggregated for a location from multiple sessions even though these sessions may have traversed multiple locations, this makes the resulting analytical data more versatile. Each chunk is intended to be unique per location. As such, embodiments of the system and method detailed herein are configured to collect chunks from a specific location, from multiple subscribers, and analyze the QoE for the specific location. The specific location may be defined based in part by the type of network being used. In some cases, a mobile network location may be based on a cell, in a fixed or Fiber to the x (FTTX) network, a location may be based on an access concentrator, and the like. The system may gain awareness of various dimensions by reviewing a signaling flow from the network, for example an S11 fee in a mobile network, a RADIUS/DHCP feed in Fixed/FTTX networks, or the like. In some cases, the dimensions may be a service plan, device type, a location, a network, a site, access point name (APN), access node, access technology, interface, gateway, upstream channels, downstream channels, 5G network slice and other additional custom dimensions.

For the activity level to be measured, granular data may be preferred. It is possible that through embodiments of the system and method described herein, raw data may provide records on a per application basis for predetermined time intervals, for example every 200 milliseconds (ms), 250 ms, 500 ms and the like. In the examples provided herein, 250 ms is used but it will be understood that records may be for a shorter or longer duration.

Embodiments of the method and system disclosed herein are intended to measure quality of each of the chunks, which may be estimated in near-real time by continuously computing the chunk bitrate, the duty cycle, and the bitrate factor. The chunk bitrate depends on the chunk volume and the chunk duration that can be measured through inline monitoring. The bitrate factor may then subsequently be used to estimate the QoE. Details of the conversion of the bitrate factor to QoE are detailed herein. Depending on the system implementation, traffic action may be taken directly on the traffic to improve the QoE, or in the case of a passive deployment where direct action may not be possible, the result could be fed to third party systems, like radio optimization modules or the like to enable more capacity for QoE improvements.

In some cases, the system and method may include traffic management capabilities, so the system and method may take action directly on the traffic to optimize for QoE. The traffic management capabilities may include, for example, shaping traffic, providing updated shaping instructions to one or more shapers to shape traffic, reprioritizing other traffic, or the like, to have a positive impact on Video QoE. If the system is inline, the system may provide for traffic management capabilities, if the system is intended to be passive, the system may provide instructions to other network devices in order to accomplish traffic management.

Figure 1:
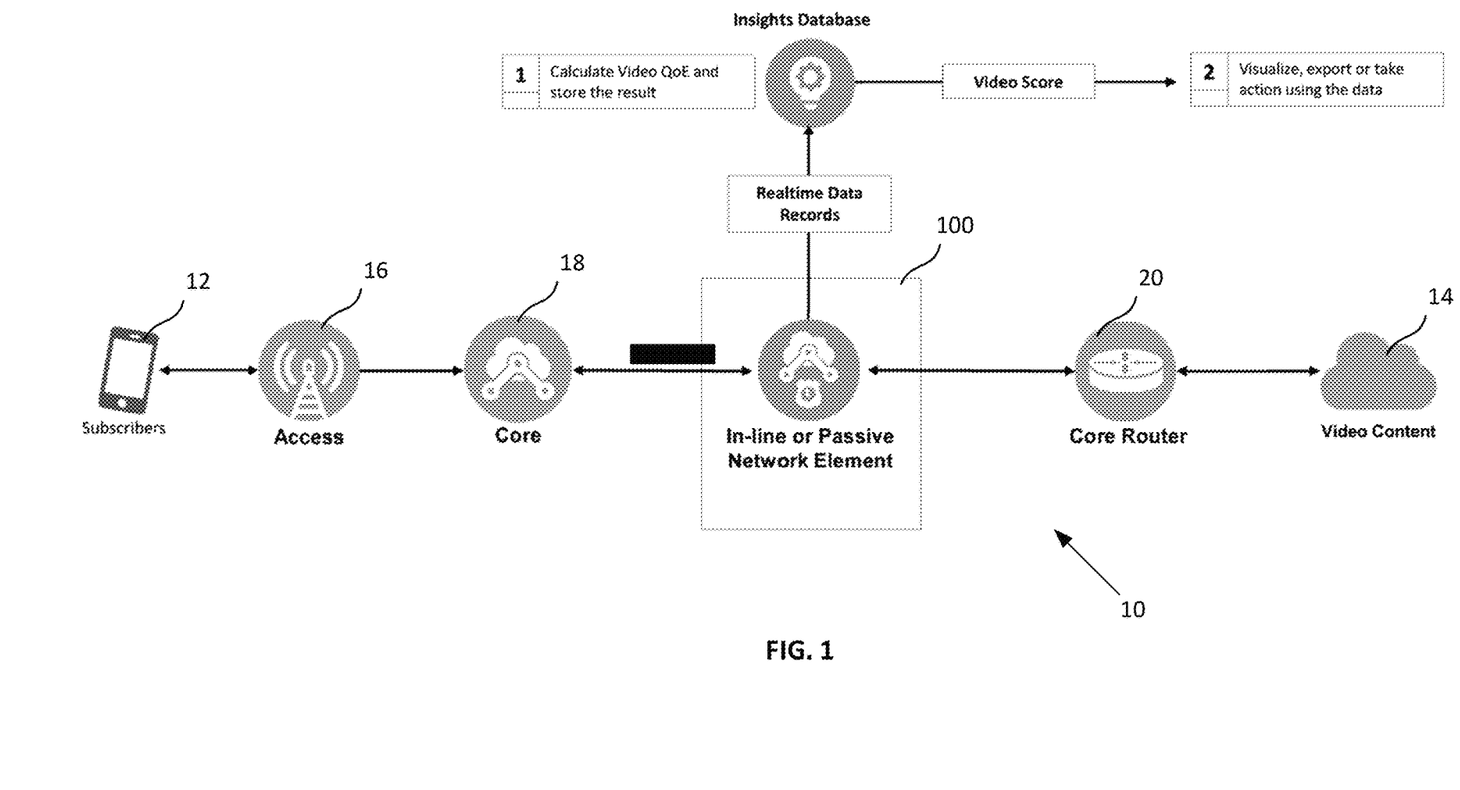
FIG. 1 illustrates a system for adaptive bitrate video streaming according to an embodiment in a network environment.

FIG. 1 illustrates an embodiment of a system for managing adaptive bitrate video streaming in a computer network environment 10. Subscribers 12 of an operator may request video content from a content provider via the Internet 14. Subscribers 12 access the operator's access network 16, which flows requests through to a core network 18. The system 100 may reside in the core network and may be inline with a core router 20. The core router 20 may receive the requested content from the video content provider and forward the content to the subscriber, via the access network 16.

Figure 2:
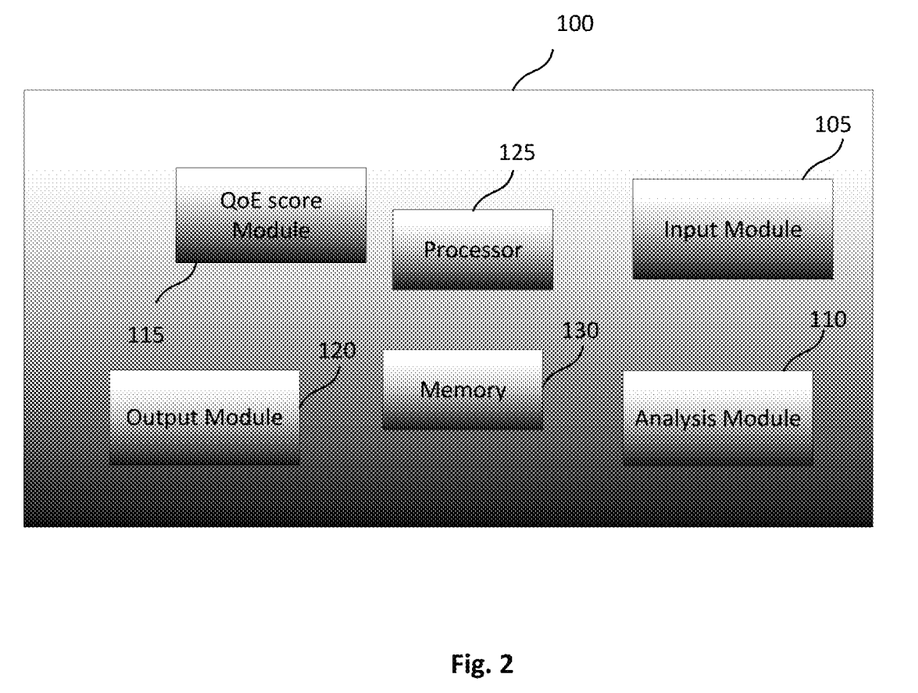
FIG. 2 illustrates a system for managing adaptive bitrate video streaming according to an embodiment.

FIG. 2 illustrates an embodiment of the system 100 for managing adaptive bitrate video streaming according to an embodiment. The system includes an input module 105, an analysis module 110, a QoE score module 115, an output module 120, a processor 125 and memory 130. In some cases, the system 100 may include a plurality of processors, for example, including at least one processor per module or per engine. In some cases, the system 100 may be distributed and may be housed in a plurality of network devices. In other cases, the system may reside in a single network device. In some cases, the memory 130 may be included as an internal component of the system. In other cases, the memory component 130 may be housed externally or in a cloud and may be operatively connected to the system and the components of the system. In some cases, the memory component 130 may store instructions that, when executed by the processor 125, cause the modules to perform the configured tasks. The system is intended to reside on the core network.

The input module 105 is configured to receive or retrieve real-time data records via third party network devices, for example a Deep Packet Inspection network device or a Packet Processing network device. The real-time data records are intended to include data associated with active bitrate video streaming traffic flows. From the data records, it is intended that the input module 105 may determine the duration, volume, and activity of the video stream traffic flow. The input module 105 may determine the video chunking as detailed herein.

The analysis module 110 is configured to review the data records to gain insight into the dimensions associated with the content and the associated QoE of the subscriber viewing the content, as detailed herein. In some cases, dimensions may include, for example, service plan, device type, a location, a network, a site, access point name (APN), and the like. The analysis module 110 may determine a video stream parameters, for example, bitrate, duty cycle and bitrate factor and the like, associated with the video stream traffic flow. The analysis module 110 may receive measured data from the input module 105, or may retrieve the data from the input module 105 to determine the associated dimensions and parameters.

The QoE score module 115 is configured to calculate the QoE score based on the analysis of the analysis module 110. The QoE score may be determined by a localized region, by a set of subscribers or the like. In some cases, the QoE score module may be configured to aggregate QoE scores for a particular dimension or over a plurality of dimensions, based on the parameters and dimensions provide by the analysis module 110. In a particular example, the QoE module 115 may aggregate all of the QoE scores for subscribers between a time interval in a particular location to determine, for example, whether a location appears to be congested. It is intended that providing an aggregate QoE score for a particular dimension or over a plurality of dimensions may aid a network operator in capacity planning and network understanding.

The output module 125 is configured to either take action/implement a change based on the QoE score, export the analytics and QoE score to an operator or other third party, produce a report or visualization of the analytics or the like.

In some cases, the system may be operatively connected with at least one shaper, configured to shape the traffic based on, for example, the output from the output module 125. In this way, the system can provide an output that implements a change in the operation of the shaper. The system may alternatively be operatively connected to various traffic management modules/devices such that the output can implement changes in those traffic management modules/devices.

Figure 3:
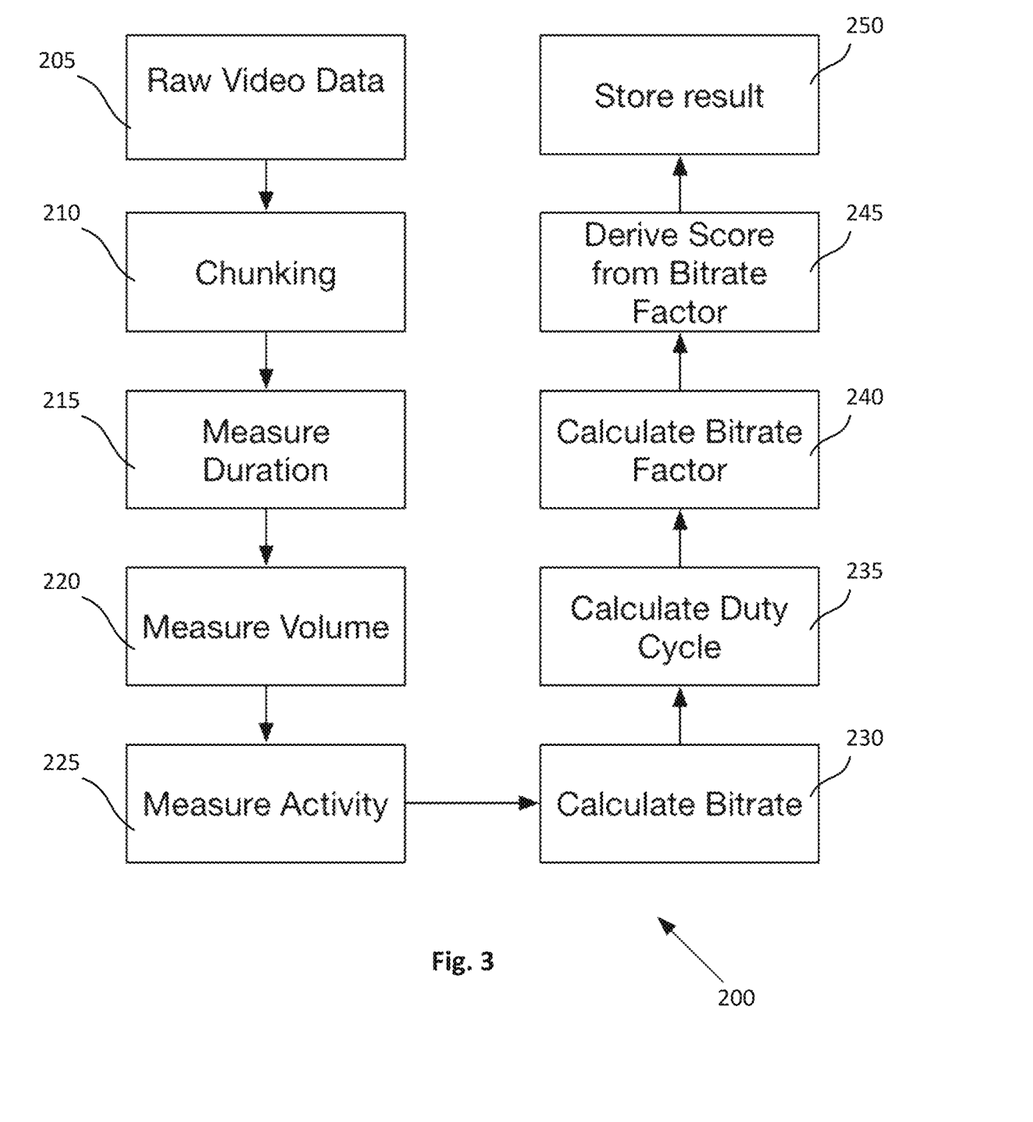
FIG. 3 is a flow chart illustrating an embodiment of a method for managing adaptive bitrate video streaming.

FIG. 3 illustrates an embodiment of a method 200 for managing adaptive bitrate streaming. The input module 105 collects or receives raw video data at 205. The input module 105 may then determine the video chunking, at 210, as detailed herein. The input module 105 may measure at least one of the duration at 215, volume at 220 and activity of the video stream at 225. It will be understood that these measurements may be calculated serially or in parallel/simultaneously. The analysis module 110 may further calculate characteristics/parameters such as a bitrate at 230, a duty cycle at 235 and a bitrate factor at 240 from the measured data received from or retrieved from the input module. These calculations may also be done serially or in parallel.

The QoE module 115 may determine a QoE score based on the bitrate factor, at 245. The output module 120 may then store a result or may suggest or implement action based on the score, at 250. It will be understood that the method may run continuously, or may be performed at predetermined intervals. In some cases, the method may be configured to run when there is a change to the video stream, for example, when the subscriber has changed location, channel or the like. In some cases, the QoE score of a plurality of subscribers may be aggregated by the QoE module over a particular dimension or a plurality of dimensions of interest for a network operator.

Embodiments of the system and method may use predetermined high frequency data, which may contain records of incoming and outgoing data volume per application with highly granular dimensions, various aspects of the associated data with the video chunk. These records may be received by or retrieved by the input module 105, for example, every 250 ms or the like. In some cases, the dimensions may be a service plan, device type, a location, a network, a site, access point name (APN), access node, access technology, interface, gateway, upstream channels, downstream channels, and other additional dimensions, which may be customized or configured in various ways. In some cases, only a subset of the dimensions may be used, and the dimensions may depend on, for example, the type of network. A benefit of the dimensional granularity is that data can be analyzed on any given dimension. For example, Video QoE can be compared for different devices using a device column, or different service plans using a service plan column, and may also be compared in various combinations, for example, comparing device makers, device types and devices models within a specific service plan. Custom dimensions may be determined by a network operator and may be supported by embodiments of the system and method for dimensional data. Dimensions are intended to be used when analyzing the results as detailed herein.

Figure 4:
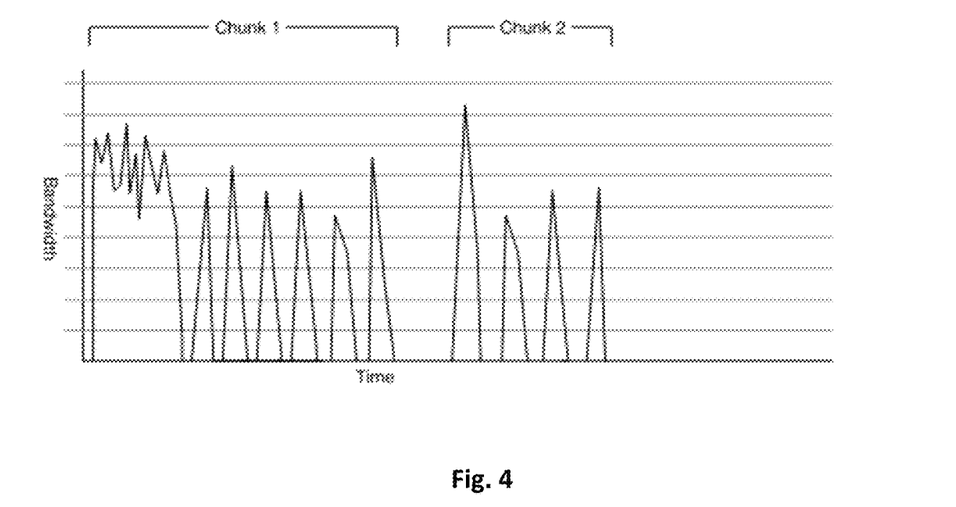
FIG. 4 illustrates an example of video chunks.

The analysis module 110 is configured to analyze the patterns in the traffic. In particular, a plurality of records will be grouped together into chunks, where a chunk is unique per dimension (for example, a location), separated by a silence period and may contain one or multiple video loading events, where the video player is downloading a segment of adaptive bitrate video. A silence period is intended to be a period of no data for a predetermined time, such as a number of milliseconds, seconds or the like. In some cases, the predetermined number of milliseconds or seconds may be 1, 2, 3 or the like. In some cases, a network operator may configure the silence period to a predetermined number of milliseconds or seconds that is intended to reflect an appropriate silence period for the network in question. An example of video chunks is shown in FIG. 4.

The analysis module 110 may further determine the start and end of a video chunk and the total duration for the chunk. In some cases, the analysis module 110 may determine or calculate the load or loading events of the video chunk.

Figure 5:
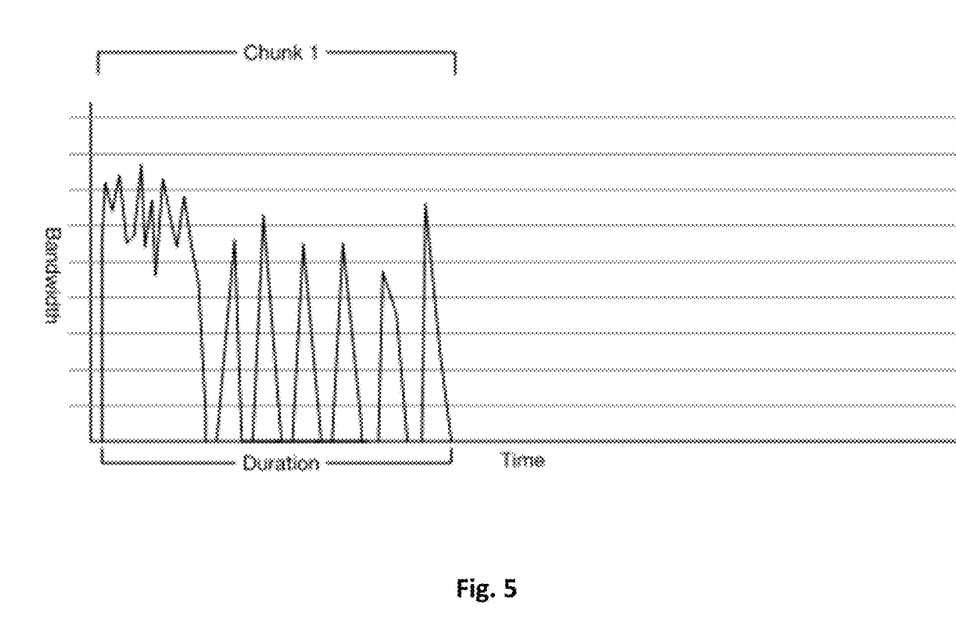
FIG. 5 illustrates an example of chunk duration.

Further, the system may summarize a total downstream volume of all records for the load events in the chunk that may allow for the total chunk volume to be calculated. An example of video chunk duration can be seen in FIG. 5.

By counting the number of samples that have had a downstream transfer volume greater than 0 bytes, the activity rate of the chunk can be determined by the analysis module. It will be understood that the records may be completed for example, every 250 ms, which would allow the system to determine the length of time or chunk duration.

By multiplying the chunk volume by 8 bits and dividing by chunk duration a bitrate for the chunk can be calculated by the analysis module 110. The bitrate can be used to estimate the chunk resolution, based on assumed bitrate to resolution ratios for a given Streaming Video Service. In some cases, this estimation can be determined by a table or other mapping. In a specific example, a table of bitrate to resolution estimation is shown below.

TABLE 1

Example of bitrate to resolution estimation

| Bitrate Range | Estimated Resolution |
|---|---|
| 0-80 Kbps | Low resolution video/Audio only |
| 81-130 Kbps | 144 p |
| 131-350 Kbps | 240 p |
| 351-625 Kbps | 360 p |
| 626-1100Kbps | 480 p |
| 1101-2250Kbps | 720 p |
| 2251-4500Kbps | 1080 p |
| 4501-9000Kbps | 1440 p |

TABLE 1-continued

Example of bitrate to resolution estimation

| Bitrate Range | Estimated Resolution |
|---|---|
| 9001-200000Kbps | 2160 p |
| 20000 Kbps - | Above 2160 p |

Figure 6:
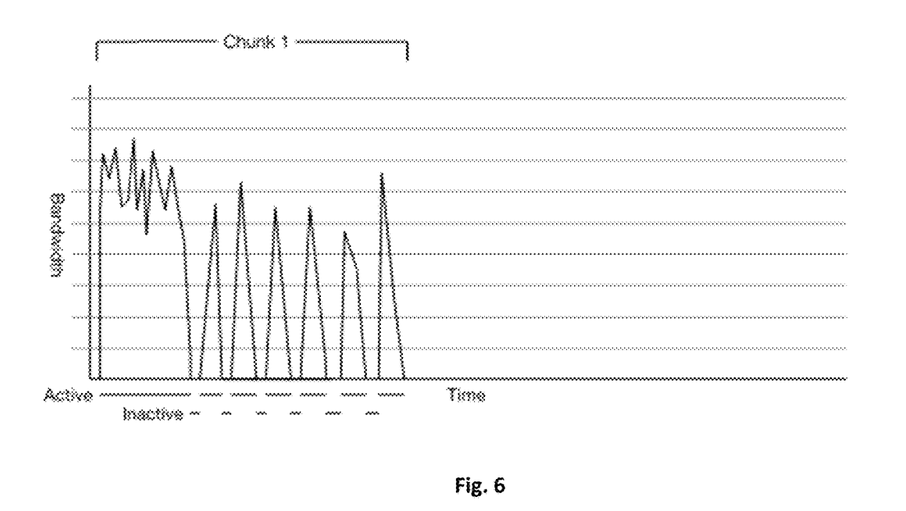
FIG. 6 illustrates an example of chunk activity rate.

By dividing the chunk activity rate with the total number of intervals within the chunk duration a duty cycle can be calculated by the analysis module 110. The duty cycle is indicative of how fast the chunk is sent over the network, a low duty cycle indicates there is plenty of capacity available while a high duty cycle indicates there is congestion on the network. As an example, 0 to 0.25 may typically be considered as a low duty cycle, while above 0.5 may be considered high. It will also be understood that the ranges of high and low duty cycle may depend on the video application. As a specific example, it has been viewed that Netflix™ is aggressively pushing higher bitrates compared to YouTube™ and therefore the duty cycle is typically higher for Netflix™, than it would be for YouTube™. An example of chunk activity rate can be seen in FIG. 6.

By dividing the chunk bitrate by the duty cycle, the bitrate factor for the chunk can be established, by the system. The bitrate factor indicates the maximum attainable bandwidth if the streaming video has been loading constantly. In some cases, it will be understood that having a low bitrate with a low duty cycle would indicate that the subscriber is likely experiencing an appropriate QoE.

This analysis gives a measure that is intended to remove video supply (available resolution) and consumer demand (screen size) from the QoE determination. This is intended to provide a more accurate determination of the network capability rather than including the capability of the video service or video client.

In a specific example, if a subscriber receives a chunk at 1700 Kbps (estimated 720p) with a duty cycle of 0.1, this would imply the bitrate factor is 1700/0.1=17000 Kbps, if there was demand (for example, a larger screen size) and supply (for example, 2160p encoded video) the subscriber could have received a much higher resolution without risking a buffer stall.

On the other hand, if a subscriber receives a chunk at 1700 Kbps (estimated 720p) with a duty cycle of 0.8, this would imply the bitrate factor is 1700/0.8=2125 Kbps, the network may not be capable of delivering a higher resolution even if the device would benefit from a higher resolution and the video was available in a higher resolution.

A QoE score can be derived from various variables. In particular, as an example, a QoE score can be derived from the Bitrate Factor. In some cases, the QoE score may be considered as an absolute score, which does not take into consideration service plans, devices, limitations of access technology or such into account, or may be considered as a relative score that factors in limitations of a price plan, device, access technology or fair usage policy. A table showing examples of bitrate factor to QoE score is shown below.

TABLE 2

Bitrate Factor and Score

| Bitrate Factor | Score |
| --- | --- |
| 0 bps | 0 |
| 450000 bps | 1 |
| 900000 bps | 2 |
| 1800000 bps | 3 |
| 3600000 bps | 4 |
| 7200000 bps and up | 5 |

Embodiments of the system and method for managing Adaptive Bitrate Video Streaming Quality of Experience derived from high frequency sampling provides a general QoE score for Streaming Video, on a per video chunk basis, focusing on the networks ability to deliver the video, while using the duty cycle to weight in the supply and demand factor. Embodiments of the system and method are intended to not be dependent on modeling specific video services and/or consumer devices for analytics and are intended to adapt to changing conditions in video streaming offerings. The system and method detailed herein are also not dependent on specific transport protocols, such as HTTP, TLS/HTTPS and/or QUIC.

As each chunk has a QoE score, the resulting data can be used to score any dimension available in the input data, for example: per video service, per subscriber, per location, per device, or the like, or combinations of the dimensions. It is intended that the system and method provide responses to network operators on a variety of network capacity questions, for example, "How is video delivered to Apple™ devices on a low end plan?" It is understood that the system may aggregate scores on a plurality of dimensions, and the example above includes two dimensions, device manufacturer as well as service plan.

It is intended that this type of result would provide for the operator to make informed traffic policy decisions based on the output from the system. As video streaming traffic flows become more encrypted, the embodiments of system and method provided herein are intended to provide for analytics of video streaming traffic flow from the state of the flow, and not requiring the decryption of the data within the traffic flow.

Figure 7:
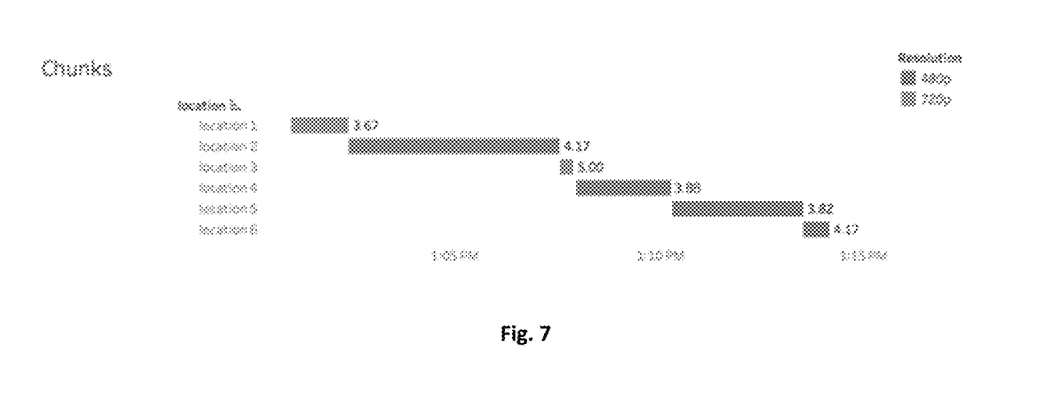
FIG. 7 illustrates example of multiple chunks analyzed together with score.

Chunks may also be grouped to analyze a complete video session traversing a plurality of chunks and/or locations. FIG. 7 illustrates an example of multiple chunks analyzed together with a score, providing a holistic view of a video experience across multiple locations. The X-axis in FIG. 7 is time. FIG. 7 is intended to illustrate the mobility journey of a user, the size represents time spent at a given location, which becomes a chunk that is reviewed, analyzed and scored, for that location. In some cases, where the location is fixed, there may only be a single chunk per video session.

Near real-time measurement of Video QoE may be useful for Intent Based Traffic Management where traffic policies may be adapted based on measured quality, with the overall objective of increasing quality for all subscribers. Embodiments of the method and system provided herein are intended to provide value in analytical use-cases, providing insights into how video is delivered over the network, through data on a per subscriber to Customer Experience Management (CEM) systems, allowing customer care to better advice subscribers facing QoE problems, or through data on a per location basis feeding into network planning systems to help determine if Video QoE can be improved through traffic management or whether capacity expansion for a given location.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing adaptive bitrate video streaming, the method comprising:
retrieving raw data associated with a video stream traffic flow;
determining at least one video chunk from the raw data;
determining parameters associated with the video chunk, wherein the parameters include at least a measured chunk volume and a measured chunk duration;
determining a bitrate of the video chunk using the chunk volume and the chunk duration wherein the bitrate provides for an estimated resolution of the video chunk;
determining a bitrate factor based on the parameters, wherein,
the parameters comprise the bitrate of the video chunk and a duty cycle,
wherein the duty cycle is calculated by dividing an activity rate of the video chunk with a total number of intervals within the chunk duration and is indicative of how the video chunk is sent over the network,
wherein a low duty cycle indicates capacity on the network and a high duty cycle indicates congestion on the network,
wherein the bitrate factor is determined by dividing the bitrate of the video chunk by the duty cycle, and
wherein the bitrate factor indicates a maximum attainable bandwidth for the video stream;

determining a Quality of Experience (QoE) score based on the bitrate factor, wherein a larger value of bandwidth for the bitrate factor corresponds to a larger QOE score; and providing a traffic action based on the QoE score.

2. A method according to claim 1, the method further comprising:

determining at least one dimension from the raw data associated with the video stream traffic flow: and wherein the determining a QoE score is also based on the at least one dimension.

3. A method according to claim 2, wherein the at least one dimension is selected from a group comprising:

service plan, device type, a location, a network, a site, access point name (APN), access node, access technology, interface, gateway, upstream channels, downstream channels, and 5G network slice.

4. A method according to claim 2, wherein providing the traffic action is based on the at least one dimension and the QoE score.

5. A method according to claim 1, wherein the raw data is retrieved at a predetermined time interval.

6. A method according to claim 5, wherein the predetermined time interval is between 200 and 500 milliseconds.

7. A method according to claim 1, wherein the video streaming traffic flow is an encrypted flow.

8. A method according to claim 1, wherein the video chunk is determined based on a period of activity followed by a period of silence in the video streaming traffic flow.

9. A system for managing adaptive bitrate video streaming, the system comprising at least one processor and a memory component, the processor configured to execute instructions stored in the memory component wherein the instructions provide for modules comprising:

an input module configured to retrieve raw data associated with a video stream traffic flow;

an analysis module configured to determine, at least one video chunk from the raw data of video stream traffic flow and determine parameters associated with the video chunk, wherein the parameters include at least a measured chunk volume and a measured chunk duration, a bitrate of the video chunk using the chunk volume and the chunk duration wherein the bitrate provides for an estimated resolution of the video chunk, and a bitrate factor based on the parameters, wherein the parameters comprise the bitrate of the video chunk and a duty cycle, wherein the duty cycle is calculated by dividing an activity rate of the video chunk with a total number of intervals within the chunk duration and is indicative of how the video chunk is sent over the network, wherein a low duty cycle indicates capacity on the network and a high duty cycle indicates congestion on the network, wherein the bitrate factor is determined by dividing the bitrate of the video chunk by the duty cycle, and wherein the bitrate factor indicates a maximum attainable bandwidth for the video stream;

a Quality of Experience (QoE) module configured to determine a QoE score based on the bitrate factor, wherein a larger value of bandwidth for the bitrate factor corresponds to a larger QOE score; and an output module configured to provide a traffic action based on the QoE score.

10. A system according to claim 9, wherein the analysis module is further configured to determine at least one dimension from the raw data associated with the video stream traffic flow; and the QoE module is further configured to determine a QoE score based on the at least one dimension.

11. A system according to claim 10, wherein the at least one dimension is selected from a group comprising: service plan, device type, a location, a network, a site, access point name (APN), access node, access technology, interface, gateway, upstream channels, downstream channels, and 5G network slice.

12. A system according to claim 10, wherein the output module is configured to provide the traffic action based on the at least one dimension and the QoE score.

13. A system according to claim 9, wherein the input module is configured to retrieve raw data at a predetermined time interval.

14. A system according to claim 13, wherein the predetermined time interval is between 200 and 500 milliseconds.

15. A system according to claim 9 wherein the video streaming traffic flow is an encrypted flow.

16. A system according to claim 9, wherein the analysis module is configured to determine the video chunk based on a period of activity followed by a period of silence in the video streaming traffic flow.

\* \* \* \* \*